United States Patent [19]

Thomey

[11] Patent Number: 4,750,851
[45] Date of Patent: Jun. 14, 1988

[54] SELF-ALIGNING PIVOT BOLT

[75] Inventor: Henry W. Thomey, Windsor, Canada

[73] Assignee: Dyneer Corporation, Scottsdale, Ariz.

[21] Appl. No.: 73,746

[22] Filed: Jul. 15, 1987

[51] Int. Cl.⁴ .............................................. F16B 19/00
[52] U.S. Cl. .................................. 411/360; 411/386; 411/301
[58] Field of Search .............. 411/360, 366, 301, 302, 411/427, 436, 386, 387, 918

[56] References Cited

U.S. PATENT DOCUMENTS

| 131,945 | 10/1872 | Dunlap | 411/301 |
| 2,908,309 | 10/1959 | Brill | 411/301 |
| 4,600,343 | 7/1986 | Frerejacques | 411/386 |

FOREIGN PATENT DOCUMENTS 473206 10/1914 France ................................ 411/386

Primary Examiner—Neill R. Wilson
Attorney, Agent, or Firm—Michael Sand Co.

[57] ABSTRACT

A self-aligning pivot bolt for mounting a belt tensioner idler pulley on a base member in which the bolt is formed with upper and lower cylindrical pilot sections separated by an intermediate threaded section. The base member has a bolt receiving opening formed with upper and lower inwardly tapered sections. The bolt and opening are dimensioned so that a lead thread of the threaded section engages an upper portion of the lower tapered section prior to the pilot sections engaging the respective tapered sections of the opening. After partial engagement of the threaded section the lower pilot section begins engagement with the lower tapered section to axially align the bolt within the hole followed by engagement of the upper pilot section with the upper tapered section. The softer metal of the base member flows into the root areas of the bolt threads to trap the bolt in the opening of the base member. The progressive engagement of the pilot sections with the tapered sections of the base member opening insures proper alignment of the bolt within the opening.

10 Claims, 2 Drawing Sheets

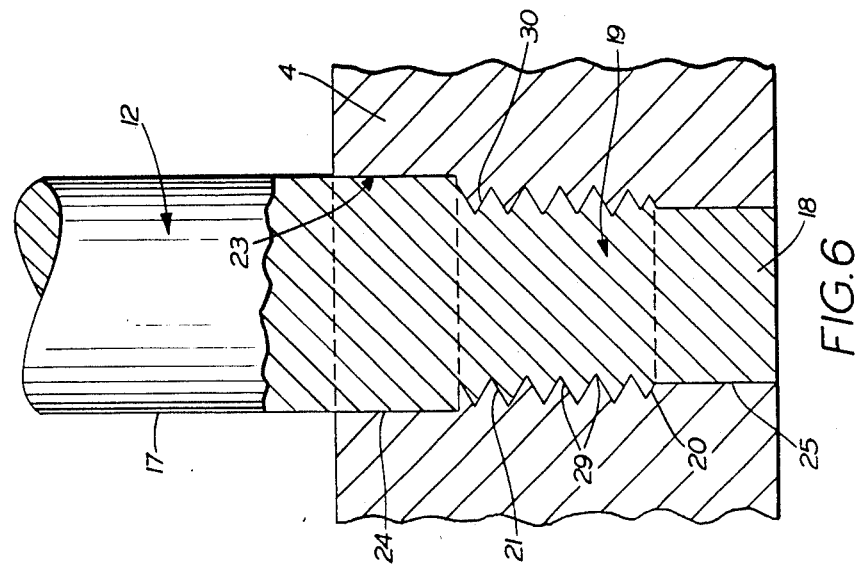
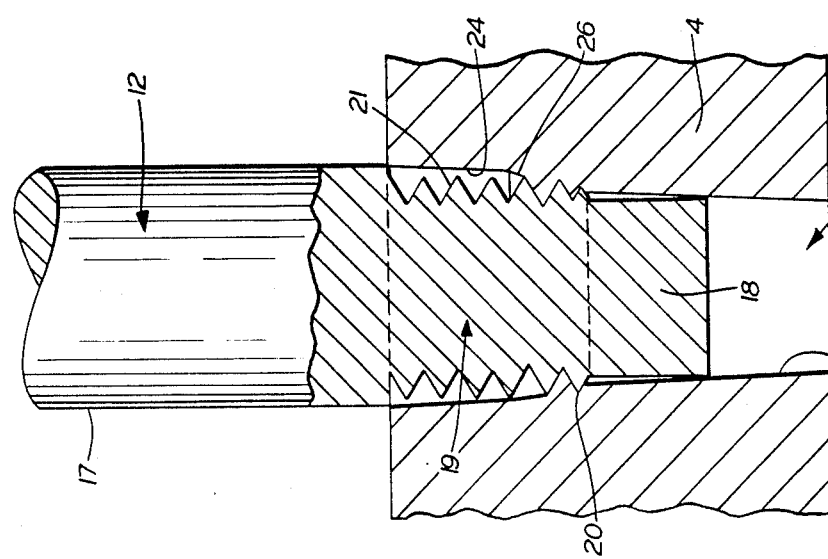
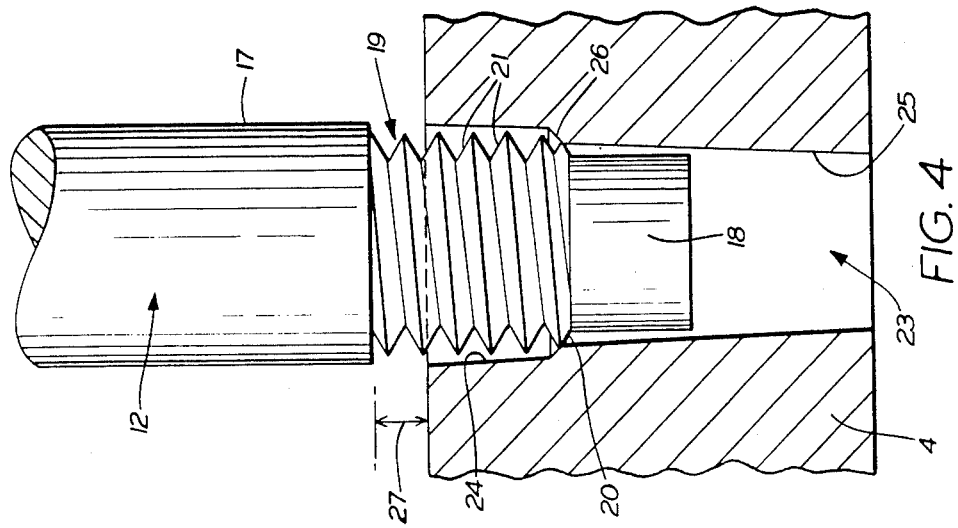

SELF-ALIGNING PIVOT BOLT

TECHNICAL FIELD

The invention relates to pivot bolts and particularly to accurate aligning of a pivot bolt in the opening of a base member. More particularly, the invention relates to a self-aligning pivot bolt for mounting an idler pulley of a belt tensioner on a base to provide balanced distribution of forces on the tensioner and components thereof.

BACKGROUND ART

Drive belts for vehicle accessories in motor vehicles have long been used in the automotive industry for supplying power from a pulley connected to the engine crankshaft to the various accessories of the vehicles such as the air conditioning unit, water pump, alternator, and the like. Recently a single drive belt has been used to operate the various accessories by engagement with a pulley mounted on each of the shafts of the various accessories. With the advent of the single accessory drive belt, belt tensioners are becoming more important for maintaining a proper tension on the drive belt throughout the life of the belt. These belt tensioners come in a variety of constructions and modes of operation. One of the more common belt tensioner uses an idler pulley which is mounted on a lever arm which is pivotally mounted on a supporting bracket or base member attached to the vehicle. One type of such a belt tensioner in which the self-aligning bolt of the invention is adapted for use is shown in U.S. Pat. No. 4,551,120.

It is imperative in the mounting of the idler pulley lever arm on the base member that the pivot bolt for the arm be accurately aligned and perpendicular to the lever arm. Any misalignment will cause excess wear on a bearing which pivotally mounts the lever arm on the bolt as well as excess wear of the bearing which rotatably mounts the idler pulley on an extended end of the lever arm. Such wear shortens the life of the idler pulley, pivot bolt and associted bearings. Also, any slight misalignment of the pivot bolt and lever arm can cause the belt to become disengaged from its contact surface of the idler pulley. Likewise, such misalignment of the idler pulley lever mounting arm with its pivot bolt will appreciably shorten the life of the drive belt. It is also a problem in certain belt tensioners that the pivot bolt after extended periods of use will back out or become disengaged from the base member by the vibrations continuously exerted thereon. Therefore, it is imperative that the lever arm be properly aligned with the pivot bolt on which it is mounted as well as the pivot bolt be accurately installed in the base member or attachment bracket.

DISCLOSURE OF THE INVENTION

Objectives of the invention include providing an improved self-aligning pivot bolt which mounts the lever arm of a pivotally mounted member, and in particular mounts a lever arm of a belt tensioner idler pulley assembly on a base member, whereby the axis of the lever arm is perpendicular to the axis of the pivot bolt to reduce bearing wear and failure and to prevent disengagement of a power transmission belt from the surface of the idler pulley.

It is a further objective of the invention to provide such a self-aligning pivot bolt in which the base member is formed with an opening having a pair of tapered sections for receiving a pair of cylindrical shaped sections of the pivot bolt having an intervening threaded area, whereby the mutual engagement of the engaging surfaces in combination with the threaded area of the bolt insures that the bolt automatically aligns in the correct relationship with the base member upon driving the bolt into the base member.

Still another objective of the invention is to provide such a self-aligning pivot bolt in which the base member is of a softer material than the bolt whereby material from the base member flows into the root area of the threaded section of the bolt as the bolt is driven into the base member firmly securing the bolt therein; and in which the diameter of the lower cylindrical pilot section is larger than the diameter of the roots of the threaded section whereby the material of the base member which flows into the root areas extends inwardly beyond the outer dimensions of the lower pilot section to prevent disengagement of the bolt from within the mounting opening in the base member.

These objectives and advantages are obtained by the improved self-aligning pivot bolt and mounting member combination of the invention, the general nature of which may be stated as including a base member adapted to receive the pivot bolt for pivotally mounting a component thereon, said base member being formed with an opening having upper and lower axially aligned inwardly extending tapered sections concentric with a longitudinal axis of said opening; a pivot bolt having a longitudinal axis and a lower generally cylindrical pilot section, an intermediate threaded section formed by a plurality of threads and an upper generally cylindrical pilot section, all of said sections concentric with said longitudinal axis of the bolt; and the opening of the base member and pivot bolt being dimensioned whereby a lead thread of the threaded section of said bolt engages an upper portion of the lower tapered section of said opening prior to the lower pilot section engaging the lower tapered section of the base member and with a portion of the threads being partially embedded in a wall which forms the lower tapered section prior to engagement of the upper pilot with a wall which forms the upper tapered section upon the bolt being driven into the base member opening and whereby material of the base member moves into root areas of certain threads of the threaded section upon the upper and lower pilot sections becoming fully seated in the upper and lower tapered sections, respectively, of the base member to axially align the axii of said bolt and base member opening.

BRIEF DESCRIPTION OF THE DRAWINGS

A preferred embodiment of the invention, illustrative of the best mode in which applicant has contemplated applying the principles, is set forth in the following description and is shown in the drawings, and is particularly and distinctly pointed out and set forth in the appended claims.

FIG. 4 shows the pivot bolt being placed in the opening of the base member with the lead thread of the threaded section engaging the top of the lower tapered section in the base member prior to the pilot sections engaging the tapered sections of the base member;

FIG. 5 shows the position of the bolt of FIG. 4 driven partially into the base member opening in which the lead thread and an adjacent cylindrical thread is partially embedded in the base member wall of the lower tapered section of the opening with the bottom pilot beginning to engage the tapered wall of the lower tapered section just prior to engagement of the top pilot with the upper tapered section of the base member opening; and FIG. 6 shows the position of the pivot bolt when fully driven into the dual tapered opening of the base member with the metal of the lower tapered section shown in the root areas between the bolt threads and with the upper and lower cylindrical pilots fully engaged in the respective tapered sections of the base member opening.

Similar numerals refer to simiar parts throughout the drawings.

BEST MODE FOR CARRYING OUT THE INVENTION

Figure 1:
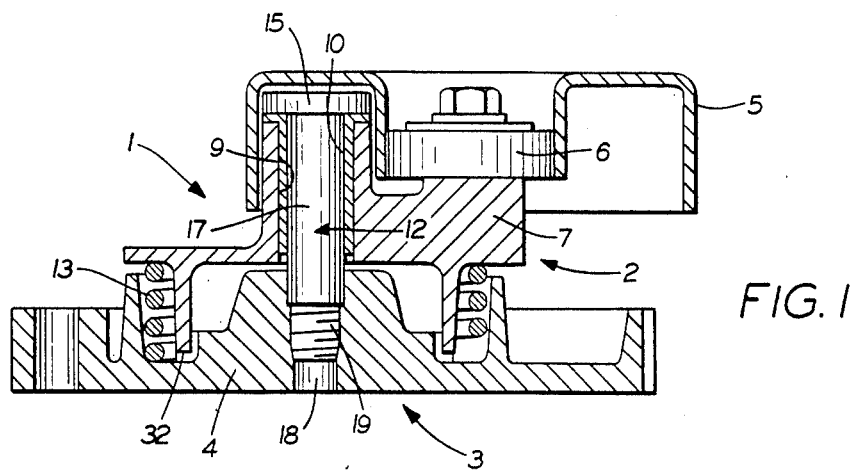
FIG. 1 is a sectional view of a belt tensioner and idler pulley of a type in which the improved self-aligning pivot bolt may be incorporated.

Improved self-aligning pivot bolt and mounting member combination of the invention is indicated generally at 1, and is shown in FIG. 1 mounting a lever arm 2 of a belt tensioner, indicated generally at 3, on a base member 4 thereof. Belt tensioner 3 may be of the type as shown in U.S. Pat. No. 4,551,120 and is used for illustration purposes only and may have other configurations without effecting the concept of the invention. Furthermore, improved pivot bolt and mounting member combination 1 may be used for other applications than for belt tensioners without effecting the concept of the invention and need not be limited to belt tensioners.

Referring to FIG. 1, belt tensioner 3 consists of an idler pulley 5 which is rotatably mounted by a bearing 6 on an outer extended end 7 of lever arm 2. The inner end of lever arm 2 is formed with a cylindrical opening 9 having a sleeve bearing 10 mounted therein for pivotally mounting arm 2 on pivot bolt 12 of the invention. A coil torsional spring 13 biases lever arm 2 in a predetermined direction for tensioning a drive belt (not shown) engaged with the other surface of idler pulley 5 in a manner well known in the art.

Figure 2:
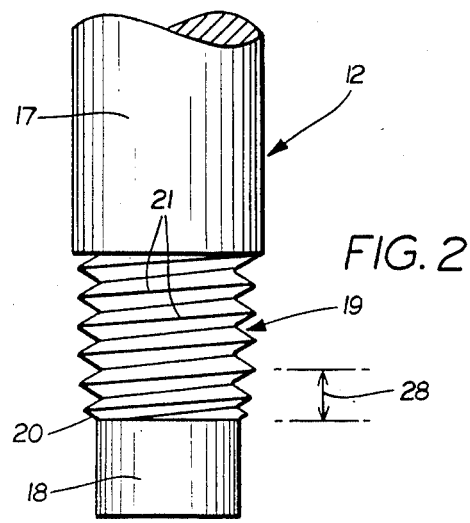
FIG. 2 is an enlarged fragmentary view of the bottom portion of the pivot bolt of FIG. 1 showing the upper and lower cylindrical pilot sections with the intervening threaded section.

Referring to FIGS. 1 and 2, improved pivot bolt 12 is formed with a flanged top head 15 which engages an outer flanged end of sleeve bearing 10. In accordance with one aspect of the invention, bolt 12 is formed with a pair of cylindrical pilot sections referred to as upper section 17 and lower section 18 separated by a threaded section indicated generally at 19. As shown in FIG. 2, upper section 17 has a larger diameter than lower section 18 and is longer in axial length. Threaded section 19 preferably is of a machine thread and has a tapered leading thread 20 and a plurality of cylindrical upper threads 21, preferably four or more as shown in FIG. 2. Bolt 12 preferably is formed of a hardened steel material so as not to deform upon driving engagement into base member 4 which preferably is formed of a softer metal such as cast aluminum.

Figure 3:
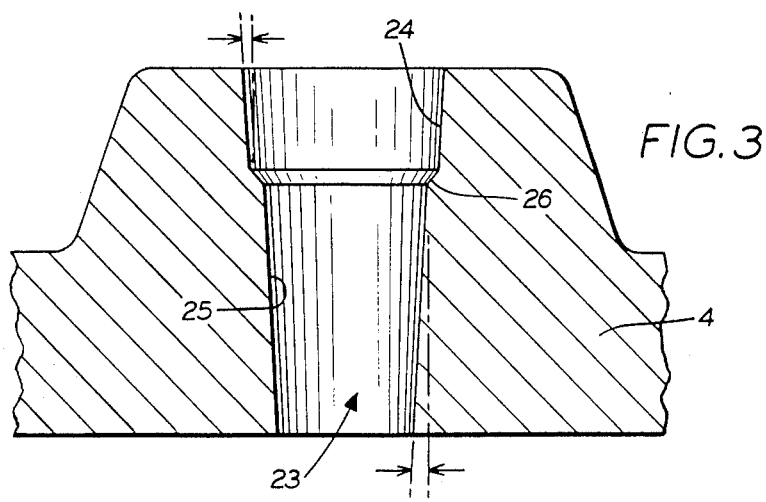
FIG. 3 is an enlarged fragmentary sectional view showing the opening formed in the base member of FIG. 1 on which an idler pulley is mounted illustrating the upper and lower tapered sections for receiving the bolt of FIG. 2 therein.

Referring to FIG. 3, base member 4 which may have various outer configurations, dimensions, and sizes, is formed with a bolt receiving opening, indicated generally at 23. Opening 23 is formed with an upper tapered section 24 and an axially aligned, longer tapered lower section 25 separated by an intermediate stepped section 26. The particular angles of taper may vary without effecting the concept of the invention.

The engagement of bolt 12 within bolt receiving opening 23 of base member 4 is shown in FIGS. 4, 5 and 6. FIG. 4 shows the initial placement of bolt 12 loosely opening 23 in which lead thread 20 comes into contact with the upper end of lower tapered section 25. In this position, upper cylindrical section 17 of bolt 12 is out of contact with upper tapered section 24 of opening 23. Also there is no contact of lower pilot section 18 with the conical wall which forms lower tapered section 25. When in this initial installation position, the distance between the top of upper tapered section 24, and the start of pilot section 17, indicated at 27, is generally equal to the axial length between the start of lead thread 20 and the peak of a first cylindrical thread 21, indicated at 28 in FIG. 2.

FIG. 5 shows the bolt being driven partially into base 4 wherein the lead threads are engaged in the upper portion of the cylindrical wall which forms lower tapered section 25, with upper and lower pilot sections 17 and 18 begining contact with the cylindrical walls forming upper and lower tapered sections 24 and 25 of opening 23. Preferably lead thread 20 and at least a portion of an adjacent cylindrical thread 21 have become enbedded in the base material forming lower tapered section 25 before engagement of the cylindrical pilots with their associated tapered sections of opening 23. Thus, any out of alignment beginning to occur between the axii of opening 23 with the axis of bolt 12 will automatically correct itself by the engagement of the cylindrical pilot sections with the associated tapered section of the base member opening. Thus although the bolt is loosely dropped into hole 23 as shown in FIG. 4, it will begin to self-align immediately after the lead thread has become partially embedded in the material of the base member as shown in FIG. 5 as the bolt advance into opening 23.

FIG. 6 shows bolt 12 fully driven into opening 23 forming an interference fit between cylindrical pilot sections 17 and 18 and tapered sections 24 and 25, respectively, with the inward engagement of the cooperating surfaces insuring correct alignment of the bolt axis with the axis of opening 23.

The partial engagement of threaded section 19 with base member 4 before engagement of the pilot sections with the tapered sections of opening 23 as shown in FIG. 5, provides a gripping action and partial mounting of the bolt within the opening. This is then followed by the self-aligning feature of the spaced pilot sections engaging and sliding along and into an interference fit with the corresponding tapered surfaces forming the tapered sections of base member opening 23.

In accordance with another feature of the invention, the diameter of lower pilot section 18 is greater than the diameter of the roots of threaded section 19 as shown in FIG. 6 which assists in preventing the pivot bolt from "backing out" of its engagement with opening 23. The softer metal of base member 4 which forms lower tapered section 25, flows or moves into root areas 29 of the threads of threaded section 19 providing a number of base member metal areas which are located axially above lower pilot section 18 thereby requiring this trapped metal, indicated at 30, to be pushed upwardly and out of the path of pilot section 18 should the bolt attempt to back out or move axially upwardly from within bolt receiving opening 23. Thus annular trapped metal areas 30 extend inwardly beyond the outer diameter of lower pilot section 18 to securely retain and lock bolt 12 in opening 23. The formation of bolt 12 of a harder material than that of base member 12 insures that the material (preferably metal) of base member 4 will flow into root areas 29 to form trapped metal portions 30. Also, it insures the interference fit of pilot sections 17 and 18 within tapered sections 24 and 25 of opening 23 as shown in FIG. 6.

Referring again to FIG. 6, the providing of the spaced pilot sections 17 and 18 in combination with the intervening threaded section 19, in addition to insuring correct alignment of bolt 12 within opening 23 also assist in maintaining this alignment. The forces exerted on the idler pulley and lever arm are transmitted to the pivot bolt and absorbed by pilot areas 17 and 18 which provide a relatively large loading surface to absorb the load and a stronger area which spreads the load throughout the length and circumference of pilot area 17 and 18. The adjacent mating surfaces of base member 4 more easily resist any bending forces and bending loads exerted thereon by the vehicle accessory drive belt. Also any damping applied to the lever arm such as through a damping brake band 32 as shown in FIG. 1, is also absorbed and pressed upon pilot section 17 and 18 of bolt 12. Thereby the damping forces in addition to any bending forces, are applied to the pivot bolt and in particular to the pilot areas thereof, without materially being applied to the threaded engagement between the bolt and base member further preventing any backing out of the bolt from within its mounting opening in the base member.

Thus the improved self-aligning pivot bolt and mounting member combination provides a means of easily mounting the idler pulley lever arm of a belt tensioner on a base member in a simple and economic manner, and in particular insures alignment of the pivot bolt perpendicularly to the axis of the lever arm to eliminate any misalignment therebetween thus avoiding unbalanced forces on the idler pulley bearings or on the lever arm bearing, and which provides an arrangement whereby larger and stronger areas of the pivot bolt absorb the bending and damping forces exerted on the bolt during operation of a belt tensioner.

As set forth above, although the preferred embodiment of the self-aligning bolt and mounting member is directed to a belt tensioner for a vehicle accessory drive belt system, it need not be so limited but can find other uses in pivotal mounting arrangements.

Accordingly, the improved self-aligning pivot bolt and mounting member is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved self-aligning pivot bolt is constructed and used, the characteristics of the construction, and the advantageous, new and useful results obtained; the new and useful structures, devices, elements, arrangements, parts, and combinations, are set forth in the appended claims.

What is claimed is:

1. A self-aligning pivot bolt and mounting member combination including:
    (a) a base member adapted to receive the pivot bolt for pivotally mounting a component thereon, said base member being formed with an opening having upper and lower axially aligned inwardly extending tapered sections concentric with a longitudinal axis of said opening;
    (b) a pivot bolt having a longitudinal axis and a lower generally cylindrical pilot section, an intermediate threaded section formed by a plurality of threads and an upper generally cylindrical pilot section, all of said sections concentric with said longitudinal axis of the bolt; and
    (c) the opening of the base member and pivot bolt being dimensioned whereby a lead thread of the threaded section of said bolt engages an upper portion of the lower tapered section of said opening prior to the lower pilot section engaging the lower tapered section of the base member and with a portion of the threads being partially embedded in a wall which forms the lower tapered section prior to engagement of the upper pilot with a wall which forms the upper tapered section upon the bolt being driven into the base member opening and whereby material of the base member moves into root areas of certain threads of the threaded section upon the upper and lower pilot sections becoming fully seated in the upper and lower tapered sections, respectively, of the base member to axially align the axii of said bolt and base member opening.

2. The combination defined in claim 1 in which the pivot bolt is formed of a harder material than the material of the base member.

3. The combination defined in claim 2 in which the bolt is formed of a hardened steel and the base member is formed of aluminum.

4. The combination defined in claim 1 in which the upper and lower pilot sections have an interference fit with the upper and lower tapered sections, respectively, when the pivot bolt is fully seated in the opening of the base member.

5. The combination defined in claim 1 in which the threaded section is longer than the lower pilot section of the pivot bolt.

6. The combination defined in claim 5 in which the upper pilot section is longer than the threaded section of the pivot bolt.

7. The combination defined in claim 1 in which the threaded section of the pivot bolt is formed with a machine thread including at least one tapered thread and at least four cylindrical threads.

8. The combination defined in claim 7 in which at least one of the cylindrical threads is engaged with the lower tapered section of the base member prior to contact of the pilot sections with the tapered sections of the base member.

9. The combination defined in claim 7 in which the diameter of the thread roots is less than the diameter of the lower pilot section.

10. The combination defined in claim 1 in which the lower tapered section of the base member opening is connected to the upper tapered section by an annular stepped section.

* * * * *